United States Patent
Bodmer et al.

(10) Patent No.: US 7,610,218 B2
(45) Date of Patent: Oct. 27, 2009

(54) INTEGRATED SHOPPING CART FOR SALE OF THIRD PARTY PRODUCTS AND SERVICES VIA THE INTERNET

(75) Inventors: Brian Bodmer, Santa Cruz, CA (US); John Rodriguez, Capitola, CA (US); Jonah Fleming, Santa Cruz, CA (US); Elizabeth McCanlies, Aptos, CA (US); Devdutt Sheth, Santa Cruz, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 1163 days.

(21) Appl. No.: 09/920,592

(22) Filed: Jul. 31, 2001

(65) Prior Publication Data
US 2003/0093321 A1    May 15, 2003

(51) Int. Cl.
G06Q 30/00    (2006.01)
G06F 17/30    (2006.01)
(52) U.S. Cl. .......................................... 705/26; 705/27
(58) Field of Classification Search ................... 705/26, 705/27
See application file for complete search history.

(56) References Cited

U.S. PATENT DOCUMENTS

| | | | |
|---|---|---|---|
| 5,319,542 A | 6/1994 | King et al. ............... | 705/27 |
| 5,666,215 A * | 9/1997 | Fredlund et al. .......... | 358/487 |
| 5,710,887 A | 1/1998 | Chelliah et al. | |
| 5,715,314 A | 2/1998 | Payne et al. ............. | 705/78 |
| 5,745,681 A | 4/1998 | Levine et al. ............ | 709/200 |
| 5,819,285 A | 10/1998 | Damico et al. ........... | 707/104.1 |
| 5,956,709 A | 9/1999 | Xue ........................ | 707/3 |

(Continued)

OTHER PUBLICATIONS

Amazon.com, archived Dec. 19, 2000, available at www.archive.org.*
Glossary, found at http://www.ablt.com/glossary.php. captured Aug. 10, 2007.*
Purchasing/Stores Glossary of Terms, found at http://www.washington.edu/admin/purchastores/glossary/glossary.cgi?letter=S, captured Aug. 10, 2007.*

(Continued)

*Primary Examiner*—Jeffrey A Smith
*Assistant Examiner*—Amee A Shah
(74) *Attorney, Agent, or Firm*—Blakely, Sokoloff, Taylor & Zafman, LLP; Judith A. Szepesi

(57) ABSTRACT

The current invention includes an improved system for an e-commerce vendor to seamlessly incorporate products and services from a third party into its own e-commerce site. This system enables the e-commerce vendor to display the third party products and to accept orders and arrange fulfillment of these products through its own site in a manner that is seamless to the end user. When the e-commerce retailer requests product information from the supplier, the supplier provides the retailer with product information and URLs at which additional information can be located. The retailer uses this information to retrieve product images, descriptions and information and to display this information to its customer on its own site. Each of these items is tagged with a unique element identifier that contains a number of details about the product. This information tagged to the product image or description enables the product to be easily identified by both the retailer and the supplier. When the customer purchases the products from the retailer, the necessary information is tagged to the product information and, thus, is available for placement of the order with the supplier. This enables the product order to be routed to and fulfilled by the third party supplier in a manner that is transparent to the customer.

29 Claims, 5 Drawing Sheets

U.S. PATENT DOCUMENTS

| | | | | |
|---|---|---|---|---|
| 6,017,157 | A * | 1/2000 | Garfinkle et al. | 705/26 |
| 6,029,141 | A | 2/2000 | Bezos et al. | 705/27 |
| 6,125,352 | A | 9/2000 | Franklin et al. | |
| 6,282,517 | B1 | 8/2001 | Wolfe et al. | |
| 6,317,722 | B1 | 11/2001 | Jacobi et al. | 705/14 |
| 6,321,231 | B1 | 11/2001 | Jebens et al. | 707/104 |
| 6,324,521 | B1 | 11/2001 | Shiota et al. | |
| 6,332,146 | B1 | 12/2001 | Jebens et al. | 707/104 |
| 6,388,732 | B1 | 5/2002 | Williams et al. | |
| 6,505,172 | B1 * | 1/2003 | Johnson et al. | 705/27 |
| 6,628,307 | B1 | 9/2003 | Fair | 345/763 |
| 6,629,079 | B1 | 9/2003 | Spiegel et al. | 705/26 |
| 6,636,863 | B1 | 10/2003 | Friesen | 707/102 |
| 6,657,702 | B1 * | 12/2003 | Chui et al. | 355/40 |
| 6,701,302 | B1 | 3/2004 | Schaeffer et al. | |
| 6,901,378 | B1 * | 5/2005 | Linker et al. | 705/27 |
| 2002/0002579 | A1 * | 1/2002 | Holden et al. | 709/200 |
| 2002/0007322 | A1 * | 1/2002 | Stromberg | 705/26 |
| 2002/0015179 | A1 * | 2/2002 | Igarashi et al. | 358/1.15 |
| 2002/0065741 | A1 * | 5/2002 | Baum | 705/26 |
| 2002/0077937 | A1 * | 6/2002 | Lyons et al. | 705/28 |
| 2002/0143637 | A1 * | 10/2002 | Shmueli et al. | 705/26 |
| 2002/0147656 | A1 * | 10/2002 | Tam et al. | 705/26 |
| 2002/0158874 | A1 | 10/2002 | Cao | |
| 2002/0184116 | A1 * | 12/2002 | Tam et al. | 705/27 |
| 2005/0114232 | A1 * | 5/2005 | McIntyre et al. | 705/27 |

OTHER PUBLICATIONS

Common Terms and Definitions, found at http://www.vendorcompliance.info/terms.htm, captured Aug. 10, 2007.*

* cited by examiner

INTEGRATED SHOPPING CART FOR SALE OF THIRD PARTY PRODUCTS AND SERVICES VIA THE INTERNET

RELATED APPLICATIONS

The present application is related to the following commonly-owned application(s): application Ser. No. 09/814,009, filed Mar. 20, 2001, entitled "Improved Internet Delivery of Digitized Photographs". The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to electronic commerce and, more particularly, an improved system and methodology for an e-commerce vendor to display, offer, accept and fulfill orders for products and services of a third party.

2. Description of the Background Art

An increasing volume of consumer and business transactions are today conducted on e-commerce sites rather than (or in addition to) face to face in traditional brick and mortar environments. Today's e-commerce sites and their operations are well known and understood. A typical e-commerce site, such as Amazon.com, has a catalog or list of products and services that are offered through the site. It also includes marketing and promotional materials that solicit orders for these products and services. After a customer enters the Web site, the customer uses a browser to view HTML pages containing product descriptions, marketing collateral, pricing and other information.

Most e-commerce vendors have made significant investments in their Web sites to provide a compelling user experience for their customers in order to encourage the customers to remain on the site and continue shopping. If the customer finds a particular product or service that he or she is interested in ordering while browsing the site, then the customer is typically given the opportunity to select this item and add it to his or her on-line "shopping cart" through an established methodology. During this process the customer confirms the specific items that he or she has selected, indicates the quantities requested and provides other details about his or her requirements. At the end of this process, the customer is typically given the choice to proceed to "check out" and pay for the items that have been selected and placed in the shopping cart or to continue shopping.

If the customer elects to continue shopping, the items the customer selected and placed in the shopping cart are retained, stored and tracked until the customer has finished shopping. When the customer is done browsing the site, then he or she can proceed to check out and complete an order for the items that have been stored in the shopping cart. As part of the check out process, the typical e-commerce site includes an integrated set of systems and processes for verifying the order, collecting payment from the customer and subsequently fulfilling the order and obtaining confirmation of delivery. The site usually operates very independently and is able to accept and fulfill customer orders through established and consistent on-line procedures without the need for manual intervention by the e-commerce vendor's employees.

In order to retain customers and increase revenues, e-commerce vendors are continually looking for ways to expand their sites by offering additional products and services. They endeavor to act as a "one-stop shop" providing a wide range of products and services to their customers. However, in expanding the scope of their offerings, these vendors must increasingly rely on third party suppliers as they do not have all of the necessary resources or capabilities to directly manufacture, process and fulfill customer orders for all of this wide range of products and services. These e-commerce vendors can, of course, easily accept and fulfill orders for many third party products that they stock in inventory in the manner described above. For example, K-MART®, or its e-commerce arm BLUELIGHT.COM®, may offer KODAK® cameras and accessories that K-MART® has purchased and has available in its inventory. In this case, K-MART® can accept and fulfill a customer order for a camera placed on its BLUELIGHT.COM® Web site without the need for further interaction with its supplier and in a manner that is relatively transparent to the customer ordering these products.

However, in other cases the e-commerce vendor may not have the necessary capabilities or resources to independently accept and fulfill orders for certain third party products or services. This is particularly true in the case of orders for more complex products or services involving a large amount of customization by the customer. For example, assume that a retailer like K-MART® wants to offer photograph or image processing services for its customers in conjunction with the sale of cameras, film and other accessories. K-MART® may not have a photo processing laboratory or the necessary processing equipment or expertise to directly provide photograph or digital image processing services and, thus, may need to outsource fulfillment.

In the particular case of photo finishing, K-MART® and most other traditional "brick and mortar" retailers have historically served as middlemen in connection with the supply of photo processing services to their customers. These retailers often have "photo centers" where customers drop off film and later return to pick up and pay for prints (and perhaps also get copies of the prints as digital images on CD-ROMs). However the actual processing has been traditionally handled by laboratories such as KODAK® that have the appropriate resources and expertise to better perform these services. A large number of similar situations exist in which both e-commerce and brick and mortar retailers prefer to outsource the supply of a particular product or service to a third party rather than to make the considerable investment necessary to develop their own offering.

Another complexity is that for certain types of products and services, customers frequently want the chance to customize the item they are ordering to meet their particular requirements rather than a standard offering. These types of custom orders can involve significantly more interaction between the customer and the product manufacturer. For example, an order for processing a roll of film may be relatively simple and merely require the development of a set of prints and return of the negatives to the customer. Another order may, however, be much more complex. The customer may require the images back in various formats (prints as well as digital images for example), may want an enlargement of one or more specific prints or may want one of the prints to be cropped in a particular manner. These types of custom orders for third party products and services can be very difficult for the e-commerce vendor to offer through its standard e-commerce site ordering and fulfillment systems as it has to balance and act as middleman between the requirements of its customers and the requirements of its supplier.

Currently, e-commerce vendors typically handle this situation by redirecting the customer to an affiliated third party business partner site. The vendor typically has a contractual relationship with the third party for obtaining a share of revenue received by the partner as a result of the referral of this customer. The vendor may include a link on its Web site that redirects the customer to its partner for these products and services. The customer can be tracked as being referred by the vendor and if the customer made a purchase, the business partner would pay a referral fee back to the referring vendor.

However there are several problems with this existing approach. First, the e-commerce vendor has several strong incentives to keep the customer on its site and to avoid redirecting the customer to a third party site. One critical concern is that if the customer is redirected to another site, then the vendor may lose the customer both for the current activity as well as for future orders. If the customer already had selected items in its shopping cart with the vendor, these items would likely be lost when the customer exited the vendor site to browse the partner site. Using the above example, if BLUELIGHT.COM® referred its customer to a partner offering photo-processing services, when the customer had completed his or her photo order he or she might not return to the BLUELIGHT.COM® site to continue shopping. If the customer did return, he or she might have to reselect the items in its shopping cart, giving the customer a further opportunity to reconsider the choice to purchase these items.

A related issue in referring the customer to the partner is that the referring vendor is likely to earn significantly less revenue on the customer transaction. On the initial order the referring vendor will usually obtain a smaller percentage of the resulting revenue when it refers the customer to a third party compared to the revenue it typically earns from directly taking the customer's order through its own Web site and arranging fulfillment by a third party. In addition, once the customer has established a relationship with the partner, the customer is likely to return directly to the partner for its future requirements. In this situation, the original referring vendor may not receive any further revenue from these subsequent transactions between its partner and the customer Another problem is that when the end user is redirected to a third party Web site, the partner site may have a very different user interface and may provide a less compelling user experience than the original site. This can be frustrating to the end user and may break the process of the customer's interaction with the e-commerce vendor. The process of redirecting the customer to a different site also may provide the customer with an opportunity to consider other alternatives or may cause the customer to simply terminate the shopping session.

Assuming that the customer did proceed to place an order after being re-directed to the partner site, then there would be an additional requirement for a subsequent exchange or synchronization of information between the referring vendor and the fulfillment partner about the products the customer had ordered, the value of the transaction, the date the transaction was fulfilled and billed to the customer, the split of customer revenue between the e-commerce vendor and the third party partner and other associated details. This exchange of information can be problematic as both the e-commerce vendor and its business partner are often reluctant to share too many details about their respective customers, products, and revenues with the other party.

For these reasons, e-commerce vendors want to retain control of their customers on their own sites rather than redirecting their customers to a third party site, even if they have a relationship with the third party and obtain a share of the resulting revenue. These vendors need a better solution to offer third party products and services in a seamless manner that makes the third party offering appear like a self-contained vendor-branded offering and provides a consistent user experience for their customers. These vendors also require an efficient way to obtain, retain and track the appropriate information about all transactions with the customer initiated through their Web sites. Given the ever-increasing popularity of e-commerce, there is much interest in finding a solution to these problems.

GLOSSARY

De-queue: De-queuing initiates the execution of the Task with the highest priority at the head of the queue. De-queuing, in the context of this disclosure, does not remove the element (Task) from the queue.

Enqueue: Enqueuing appends a Task to the tail of the queue.

HTML: HTML stands for HyperText Markup Language. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications. Further description of HTML documents is available in the technical and trade literature; see e.g., Ray Duncan, *Power Programming: An HTML Primer*, PC Magazine, Jun. 13, 1995, the disclosure of which is hereby incorporated by reference.

HTTP: Stands for "HyperText Transfer Protocol", which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in *RFC 2616: Hypertext Transfer Protocol—HTTP/1.1*, the disclosure of which is hereby incorporated by reference. *RFC 2616* is available from the World Wide Web Consortium (W3), and is currently available via the Internet at http://www.w3.org/Protocols/. Additional description of HTTP is available in the technical and trade literature; see e.g., William Stallings, *The Backbone of the Web*, BYTE, October 1996, the disclosure of which is hereby incorporated by reference.

Java: A general purpose programming language developed by SUN MICROSYSTEMS®. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java Virtual Machines (JVMs), exist for most operating systems, including UNIX®, the MACINTOSH® OS, and WIN- DOWS®. Bytecode can also be converted directly into machine language instructions by a just-in-time compiler (JIT). Further description of the Java Language environment can be found in the technical, trade, and patent literature; see e.g., Gosling, J. et al., *The Java Language Environment: A White Paper*, Sun Microsystems Computer Company, October 1995, the disclosure of which is hereby incorporated by reference.

JPEG: Full-size digital images are maintained in a Joint Photographic Experts Group or JPEG format. See e.g., Nelson, M. et al., *The Data Compression Book*, Second Edition, Chapter 11: Lossy Graphics Compression (particularly at pp. 326-330), M&T Books, 1996.

Also see e.g., *JPEG-like Image Compression* (Parts 1 and 2), Dr. Dobb's Journal, July 1995 and August 1995 respectively (available on CD ROM as *Dr. Dobb's/CD Release* 6 from Dr. Dobb's Journal of San Mateo, Calif.). The disclosures of the foregoing are hereby incorporated by reference.

Servlet: An applet that runs on a server. The term usually refers to a Java applet that runs within a Web server environment. This is analogous to a Java applet that runs within a Web browser environment. Java servlets are becoming increasingly popular as an alternative to CGI programs. The biggest difference between the two is that a Java applet is persistent. Once it is started, a servlet stays in memory and can fulfill multiple requests. In contrast, a CGI program disappears once it has fulfilled a request. The persistence of Java applets tends to make them faster.

SKU: SKU stands for Stock Keeping Unit and is a number associated with a product for inventory control purposes. Each SKU identifies an individual product and each SKU is unique to the vendor of the product. As used herein, SKU refers broadly to any product identification scheme.

Task: A Task is generically referred to as a job employs a group of finer-grained operations. However, in the context of this invention, a Task, and its orchestrated subtasks, all of which are run by the order engine, are sequenced and determined by state that is maintained in the order engine's database. This scheme of state-determined execution is the underlying mechanism for guaranteeing the service provided by the preferred embodiment. Task processing is not merely in-line code.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference.

TCP/IP: Stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., *RFC 1180: A TCP/IP Tutorial*, the disclosure of which is hereby incorporated by reference. A copy of RFC 1180 is currently available at ftp://ftp.isi.edu/in-notes/rfc1180.txt.

URL: Abbreviation of Uniform Resource Locator, the global address of documents and other resources on the World Wide Web. The first part of the address indicates what protocol to use, and the second part specifies the IP address or the domain name where the resource is located.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., *Extensible Markup Language (XML)* 1.0 specification which is available from the World Wide Web Consortium (www.w3.org), the disclosure of which is hereby incorporated by reference. The specification is also currently available on the Internet at http://www.w3.org/TR/REC-xml.

SUMMARY OF THE INVENTION

The present invention provides an improved system for an e-commerce vendor to seamlessly incorporate products and services from a third party Web site into its own e-commerce site. This system enables the e-commerce vendor to display and market the third party products and to accept orders and arrange fulfillment of these products through its own site in a manner that is seamless to the end user.

The system includes a retailer Web site, a supplier image server, an order engine, and (optionally) a third party fulfiller. The retailer is a typical e-commerce Internet Web site as described above that offers various products and services to customers via the Internet. The image server, which in an exemplary installation/deployment is typically operated by a third party supplier, contains images of products that are each identified by a unique identification number. The image server receives and responds to requests from the retailer and provides images of products for display by the retailer to the customer together with information necessary for the retailer to order these products from the supplier. The image server also provides copies of the images and associated product information as necessary to the order engine operated by the supplier in connection with the fulfillment of purchase orders received by the order engine from the retailer.

The order engine of the present invention arranges for ordering and fulfillment of orders received from the retailer. It receives a list of certain identified products and related order information from the retailer, verifies that the products are available and arranges fulfillment of these orders. The order engine may also optionally communicate with a third party fulfiller to request fulfillment by the fulfiller of certain product orders received from the retailer. In this case the order engine passes specific order requirements to the fulfiller. The order engine also communicates with the fulfiller to confirm the completion and fulfillment of the order. The order engine receives order status information from the fulfiller and passes this order confirmation back to the retailer to enable the retailer to display the order status and history to the customer.

The basic operation of this system is perhaps best explained by using the example of an e-commerce vendor that is offering products of a third party supplier to its customers. The customer interacts with the e-commerce vendor's Web site to select and view the products offered by the retailer, including the third party products. In the currently-preferred embodiment, the e-commerce vendor does not locally store the digital images of the products and related information for all of the third party products that it offered. Instead, when the vendor received a customer request regarding a particular third party product, the vendor interacts with the third party supplier to obtain images of the selected products, to display them to its customer and to enable the customer to order these products as described below.

The interaction between the retailer and the supplier is initiated by a request from the retailer to the supplier image server. In this example, the retailer generates a request for a specific product and related product information. This request is provided as an XML list to the supplier image server. The supplier server replies to the retailer with an XML list of information and URLs for the location of product images and information on the supplier site. The retailer uses this information to retrieve appropriate corresponding product images (e.g., bitmap images), descriptions and information as required for display of these images to the customer on the retailer site. This enables the retailer to retrieve and display these items on the retailer site without having to redirect the customer to the supplier site.

The customer may then review the product images and information on the retailer site. Each of these items is accompanied by a unique element identifier (an "Element ID") that identifies the specific product and contains a number of other details about the product. This information is tagged to the product image or description in order to uniquely identify a particular product. This tag enables the specific product to be easily identified by both the retailer and the supplier. If a customer requests additional information on a specific product, this request is again routed via XML from the retailer to the image server in a similar fashion to that described above. In response additional images and information are returned for rendering and viewing on the retailer site. Information about various products can be requested by the customer and returned by the retailer for viewing in this fashion.

The customer may then wish to order one or more of these products. For instance, in the example implementation of a photo-finishing application, the customer may select one or more photographs and request a certain quantity of prints in certain sizes (such as 5×7) and formats (black and white or color for example). The customer may also select other items such as a camera and a color printer from the retailer site and he or she may include all of the selected items (i.e. the photographs as well as the camera and color printer) in the same shopping cart on the retailer site. When the customer finishes shopping and proceeds to check out and purchase the items selected, the system of the present invention automatically determines which items are available in inventory and which items are to be supplied by third parties. For the items to be fulfilled by a third party, the retailer determines the supplier of the products and sends the order for the product to the supplier in the manner described below.

This order for third party products is routed by the retailer, again using XML, to the order engine in a manner that is transparent to the customer. The XML order request can be transferred by HTTP (post) or by FTP from the retailer to the order engine. This order request includes the specific Element IDs and SKUs of the images and their corresponding services or products (e.g., photofinishing for photographs) that the customer had selected for purchase as well as the relevant order information such as the customer name and address. The product information is tracked as an XML tag that identifies the Element ID of the product and the specific product SKU that was selected. The order engine receives the order from the retailer, verifies the availability of the product selected and arranges fulfillment of the order. The supplier may fulfill the order directly from its inventory or, alternatively from an external third party fulfiller that actually produces and supplies the product to the customer based on the instructions received from the supplier.

In the case of an order for products to be fulfilled by a third party fulfiller, the order engine interacts with the fulfiller to request fulfillment of specific customer order items. In this case, the order engine packages the information describing the specifics of the customer order into a format that is provided as an XML list to the third party fulfiller. The order engine also automatically generates corresponding requests for the third party fulfiller to confirm the receipt and subsequent fulfillment of the order so that the supplier can pass this confirmation of shipment back to the retailer. The fulfiller (operating corresponding compatible software) replies in an automated manner with an XML list that indicates the status of the order, such as what items have been shipped, the date of shipment, the address for shipment and other details. The order engine takes the information received from the fulfiller and passes it back to the retailer as an XML list in a format that can be understood by the retailer. This enables the retailer to display this information to the customer, for example by indicating on the customer's order history that a specific item had been shipped to the customer on a certain date.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as MICROSOFT WINDOWS® running on an IBM®-compatible PC. The present invention, however, is not limited to any particular one application or any particular environment. Instead, those skilled in the art will find that the system and methods of the present invention may be advantageously embodied on a variety of different platforms, including MACINTOSH®, LINUX®, BeOS®, SOLARIS®, UNIX®, NEXTSTEP®, FREEBSD®, and the like. Therefore, the description of the exemplary embodiments that follows is for purposes of illustration and not limitation.

I. Computer-based Implementation

A. Basic System Hardware (e.g., for Desktop and Server Computers)

Figure 1:
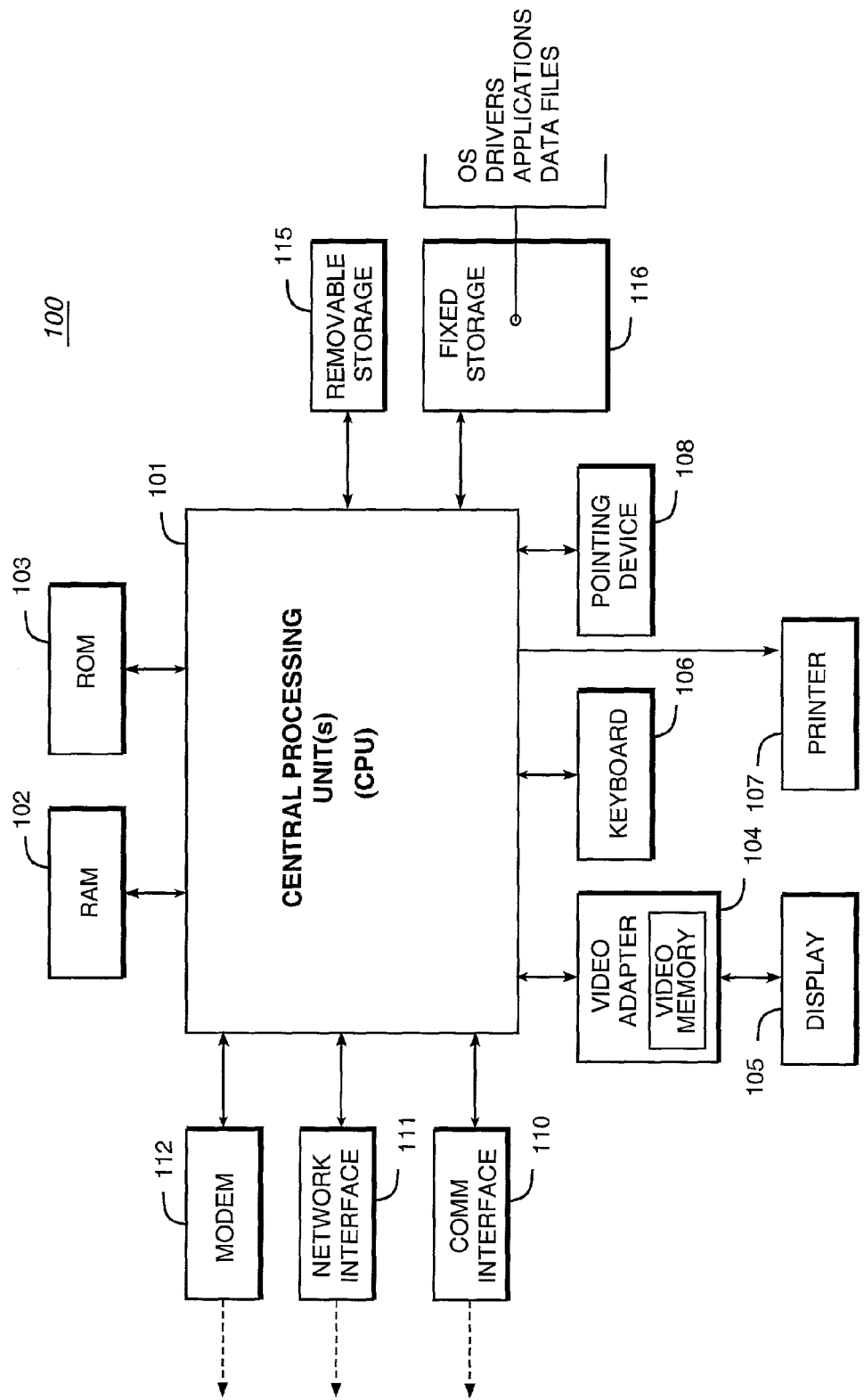
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the INTEL PENTIUM® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from INTEL CORPORATION® of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display screen 105. Likewise, the pointing device 108, such as a mouse, track ball, pen device, or the like, permits selection and manipulation of objects on the display screen. In this manner, these input devices support manual user input for any process running on the system.

The computer system 100 displays text and/or graphic images and other data on the display device 105. The video adapter 104, which is interposed between the display 105 and the system, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3COM® of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include DELL® Computers of Round Rock, Tex., COMPAQ® Computers of Houston, Tex., and IBM® of Armonk, N.Y. Other suitable computers include Apple-compatible computers (e.g., MACINTOSH®), which are available from APPLE® Computer of Cupertino, Calif., and SUN SOLARIS® workstations, which are available from SUN MICROSYSTEMS® of Mountain View, Calif.

B. Basic System Software

Figure 2:
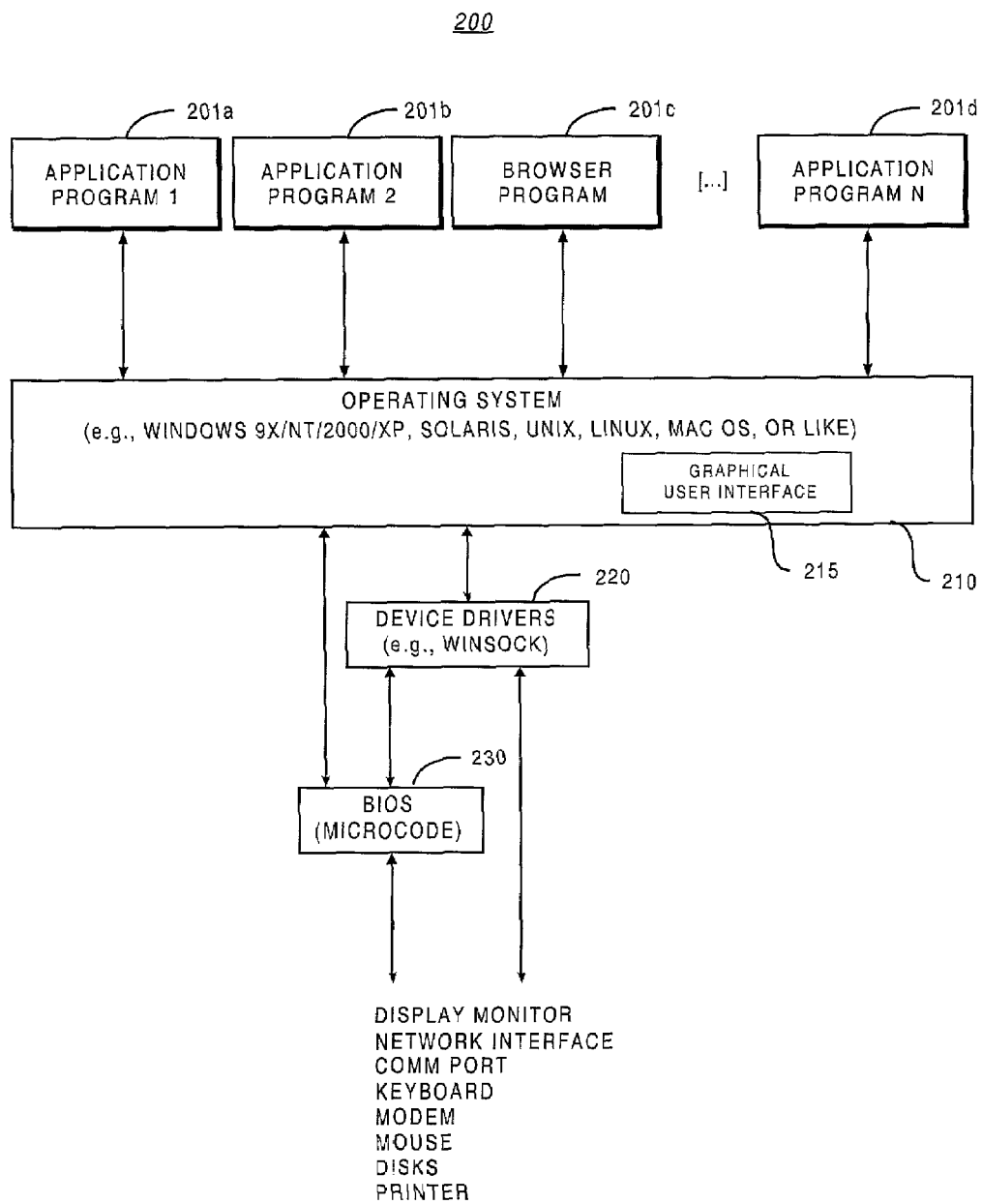
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more Web browser "clients" (e.g., NETSCAPE NAVIGATOR® or MICROSOFT INTERNET EXPLORER®). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Integrated Shopping Cart for Sale of Third Party Products Via the Internet

The present invention provides an improved system for an e-commerce vendor to seamlessly incorporate products and services from a third party Web site into its own e-commerce site. This system enables the e-commerce vendor to display and market third party products and services and to accept orders for these products and services through its own Web site in a manner that is seamless to the end user. It also enables the vendor to arrange and confirm fulfillment of these orders from the third party supplier in a fully automated manner.

A. Overview of System Components.

Figure 3:
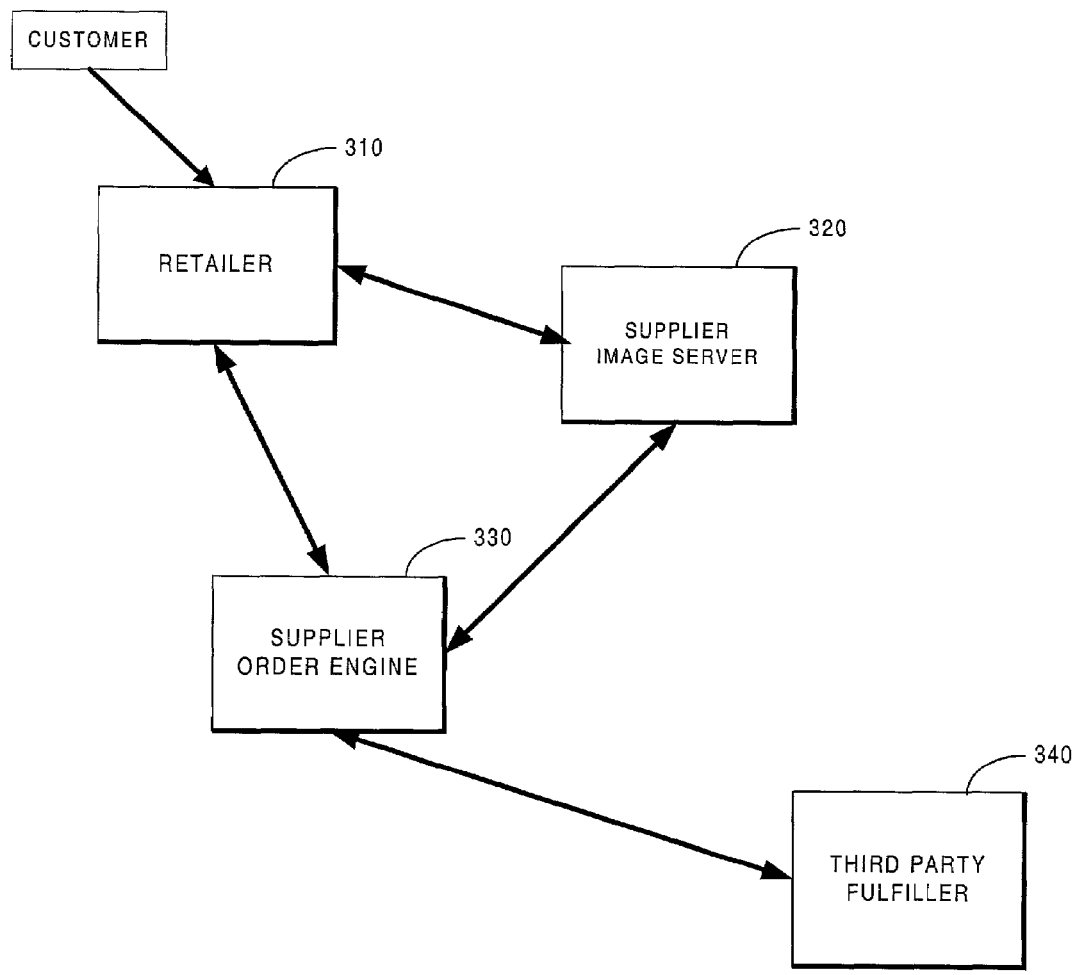
FIG. 3 is a block diagram illustrating a high-level view of the e-commerce system in which the present invention may be embodied which shows the major components of the system.

FIG. 3 is a block diagram illustrating a high-level view of the e-commerce system in which the present invention may be embodied. As shown, the system includes a retailer (module) 310, a supplier image server 320, an order engine 330, and (optionally) a third party fulfiller (module) 340. FIG. 3 also shows a customer interacting with the retailer 310.

The retailer 310 is a typical e-commerce Internet Web site as described above that offers various products and services to customers via the Internet. The retailer 310 interacts with a customer as shown on FIG. 3. The image server 320, which is typically operated by a third party supplier in an exemplary installation/deployment, contains product images and information that are each identified by a unique identification number. The image server 320 receives and responds to requests from the retailer 310 and provides product images and descriptions for display by the retailer 310 to the customer, together with information necessary for the retailer to order these products from the supplier. The image server 320 also provides copies of the images and associated product information as necessary to the order engine 330 operated by the supplier in connection with the fulfillment of purchase orders received by the order engine 330 from the retailer 310.

The order engine 330 arranges for ordering and fulfillment of orders received from the retailer 310 (i.e., based on customer interaction at the retailer's Web site). It receives a list of certain identified products and related order information from the retailer 310, verifies that the products are available from the image server 320, and arranges fulfillment of these orders. For example, in the case of an order for photographic prints, the order engine 330 communicates with the image server 320 to confirm that the requested photograph images are available and obtains copies of these images from the image server 320 in connection with the fulfillment of a customer order for prints. The order engine 330 may also optionally communicate with a third party fulfiller 340 to request fulfillment by the fulfiller of certain product orders received from the retailer 310. In this case the order engine 330 passes specific order requirements to the fulfiller 340. In the example of an order for photograph prints the order engine 330 also supplies the fulfiller with a copy of the photographic images for the selected prints that are received from the image server 320 to facilitate processing of these prints by the fulfiller. In addition, the order engine 330 communicates with the fulfiller 340 in a fully automated manner to confirm the completion and fulfillment of the order. The order engine 330 receives order status information from the fulfiller 340 and automatically passes this order confirmation back to the retailer 310. This enables the retailer to display the order status and history to the customer in a fully automated manner.

B. Basic Operation of the System.

The basic operation of this system is perhaps best explained using the following example of an e-commerce vendor that is offering photograph processing services to its customers. However, this system is not limited to being used in this context and those skilled in the art will appreciate that the present invention may also be used more generally for displaying and facilitating the ordering and fulfillment of various different types of products and services that may be offered via a Web site.

Typically, the customer's initial interaction with the vendor is to request processing of a roll of film. Traditionally, the customer drops off an exposed roll of film at a retail photo center or a retailer (e.g., WOLFE CAMERAS®, K-MART®, WALGREENS®, RITE-AID®, or the like) for developing and printing. This roll of film is developed by a third party supplier and returned to the retailer. The customer later returns to the same store to pick-up his or her processed prints and negatives. In response to customer demand many retailers also provide the customer with digital copies of the photographs on floppy disks or CD-ROMs as part of this processing service. Another approach is for the retailer to make digital images of the photographs available to the customer on the Internet. For example, when the customer returns to the K-MART® store to pick up his or her prints and negatives, he or she also receives information about how to access digital copies of the photographs on-line through BLUELIGHT.COM®, K-MART®'s e-commerce arm. This approach enables the customer to easily view the images on the Internet and also provides an opportunity for the retailer to facilitate reordering of prints through its e-commerce site, earning the additional revenues associated with this activity.

The customer's first interaction with the e-commerce site (BLUELIGHT.COM® in this example) is to register at the site and claim a roll of film that he or she has previously had processed through K-MART®. The customer may go to the retailer Web site (BLUELIGHT.COM®) and request digital copies of a particular roll of film by entering his or her name and a unique identification number. Typically, this identification number has been previously provided with the processed roll of film that he or she had already received.

This e-commerce vendor does not store all of the digital images and related information for all of its customers locally because of the storage requirements and the other considerations previously discussed. Instead, when the e-commerce vendor receives a customer request for viewing of a particular roll of film, it commences the process of interaction with the third party supplier to obtain the correct images and display them to the customer as described below.

Using this same example of photograph processing services, the customer request for a particular roll of film generates a request by the retailer 310 to the supplier image server 320 as shown on FIG. 3. The interaction between the retailer and the supplier is initiated by an automatically-generated request from the retailer to the supplier image server. In particular, the retailer generates an XML request for certain information from the supplier server. In this example, the retailer requests a specific roll of film for a certain individual from the supplier image server. Although this example describes photographic images, this request could be for other types of products or various other types of data or information that might be contained in a back-end supplier server. The supplier server replies to the retailer with an XML list of information, such as a list of products and URLs where additional information on the products can be located. The retailer may then use this information to retrieve the product descriptions and information as required for display of these images to the customer on the retailer Web site. In this example the image server returns a list of photograph images and URLs for the location of these images on the supplier image server. The retailer can then retrieve and display these images on dynamically-generated Web pages (e.g., HTML pages) on the retailer site without having to redirect the customer to the supplier site for display of the images.

The supplier image server may store the digital images in various formats, including a standard file size digital image in a larger format such as 1536 by 1024 pixels for example. However, typically, the retailer first obtains and displays to the customer a much smaller thumbnail image that is easier to transmit over the Internet. Such a thumbnail image is typically a version of the full image that has been reformatted to thumbnail size—96×64 pixels. This thumbnail image provides a reasonably Internet-distributable picture with acceptable quality for display on a computer monitor. Thus a group of 12, 24, or even 36 thumbnails representing the compressed contents of a full roll of photographs can be quickly transmitted across the Internet as a roll of thumbnail size pictures. These thumbnail-size images, although of lower fidelity, provide sufficient pictorial information for recognizing particular photographs among the group of images displayed on a computer monitor. In this regard, they serve a role similar to that of the preview sheet now included with a set of prints (e.g., for APS (Advanced Photo System) film) that enables the customer to review the images in sufficient detail to identify and select a specific photograph. In response to the retailer's request, these thumbnail-size images can be retrieved from the supplier's image server for rendering on an HTML page on the retailer's site for display to the customer.

The customer requesting the roll of film may now review the roll of thumbnail images displayed on the retailer site. Each of the individual thumbnail images is accompanied by a unique element identifier (an "Element ID") that may cross-reference relevant information, such as the identity of the customer, the roll of film, and a particular image, or the like. This unique identifier is tagged to the thumbnail image in order to uniquely identify a particular image. This tag enables the specific image on the roll of film to be easily identified by both the retailer and the supplier. The customer is also able to request a larger image of a specific photograph. A customer request for a larger version of a specific image is handled in a similar fashion to that described above. In response a larger format JPEG image is returned for rendering and viewing on the retailer site. Various images may be requested and returned for viewing in this fashion.

The same system and methodology does, of course, also apply to other products and services. The retailer can request information on certain third party products such as cameras or computers. The supplier responds with a list of the locations where summary or detailed descriptions, pictures, pricing and other relevant product information is available on its site. The retailer uses this list to obtain and display this information to its customer in the same manner as described above.

The customer may also wish to order copies of one or more of the products (i.e., the photographs) that he or she has selected. Using this same example, the customer selects one or more photographs and requests a certain quantity of prints in certain sizes (such as 5×7 or 8×10) and formats (black and white or color for example). The customer also selects other items such as a camera and a color printer from the retailer site and he or she includes all of these items (i.e., the photographs as well as the camera and color printer) in the same shopping cart on the retailer site.

When the customer finishes shopping, proceeds to check out, and purchase the items selected, the retailer determines what items are available internally in inventory and what items are supplied by third parties. Using the system of the present invention, this task may be done in a fully automated manner. The items to be fulfilled internally are handled separately through the retailer's existing processes. For those items (like the photographs in this example) to be fulfilled by an external supplier, the retailer determines the supplier of the products and the retailer sends the request for the product to the supplier in the manner described below.

As shown in FIG. 3, the retailer (module) 310 sends the order information to the order engine 330. In this example, the retailer orders certain photographs that the customer had selected and placed in his or her shopping cart on the retailer site. This order for photographs by the customer is routed by the retailer Web site, again using XML, to the order engine in a manner that was transparent to the customer. This XML request is transferred by HTTP post or by FTP from the retailer to the order engine and includes the specific Element IDs and SKUs of the photographs that the customer had selected as well as the relevant order information such as the customer name and address. This information is tracked as an XML tag that identifies the Element ID of the photograph and the specific product SKU that was selected. The order engine 330 receives the order from the retailer 310, verifies the availability of the photograph selected from the image server 320 and arranges fulfillment of the order. The supplier may fulfill the order directly from its inventory or, alternatively, from an external third party fulfiller 340 that actually produces and supplies the photograph prints to the customer based on the instructions received from the order engine.

In the case of an order for products to be fulfilled by a third party fulfiller, the order engine interacts with the fulfiller to request fulfillment of a particular customer order. In this example of the order for a set of photographs, the order engine 330 retrieves the photograph images (e.g., as JPEGs in the currently-preferred embodiment) from the image server 320 corresponding to the Element IDs of these images received from the retailer 310. These JPEG images are received by the order engine from the supplier image server. If the supplier is to fulfill the order directly, the supplier prepares the prints based on these JPEGs and the other information received from the retailer, and then ships the prints to the customer.

Alternatively, the supplier may use a third party fulfiller to produce the prints and supply them to the customer. In this case, the order engine 330 packages the JPEG images together with textual information describing the specifics of the customer order into a format that is provided as an XML list to the third party fulfiller 340 as shown in FIG. 3. Another alternative approach is for the order engine to supply the fulfiller with the specific Element IDs of the images ordered by the customer and the related order information to enable the fulfiller to directly obtain the corresponding JPEG images from the image server.

The order engine also requests the third party fulfiller to confirm the receipt and subsequent fulfillment of the order so that the supplier can pass this confirmation of shipment back to the retailer. The fulfiller replies with an XML list that indicates the status of the order, such as what items have been shipped, the date of shipment, the address for shipment and the like. The order engine receives the information from the fulfiller and passes it back to the retailer as an XML list in a format understood by the retailer. This enables the retailer to display this information to the customer, for example on the customer's order history indicating that a specific item was shipped to the customer on a certain date.

C. Flow Diagram of Integrated Shopping Cart System.

Figure 4:
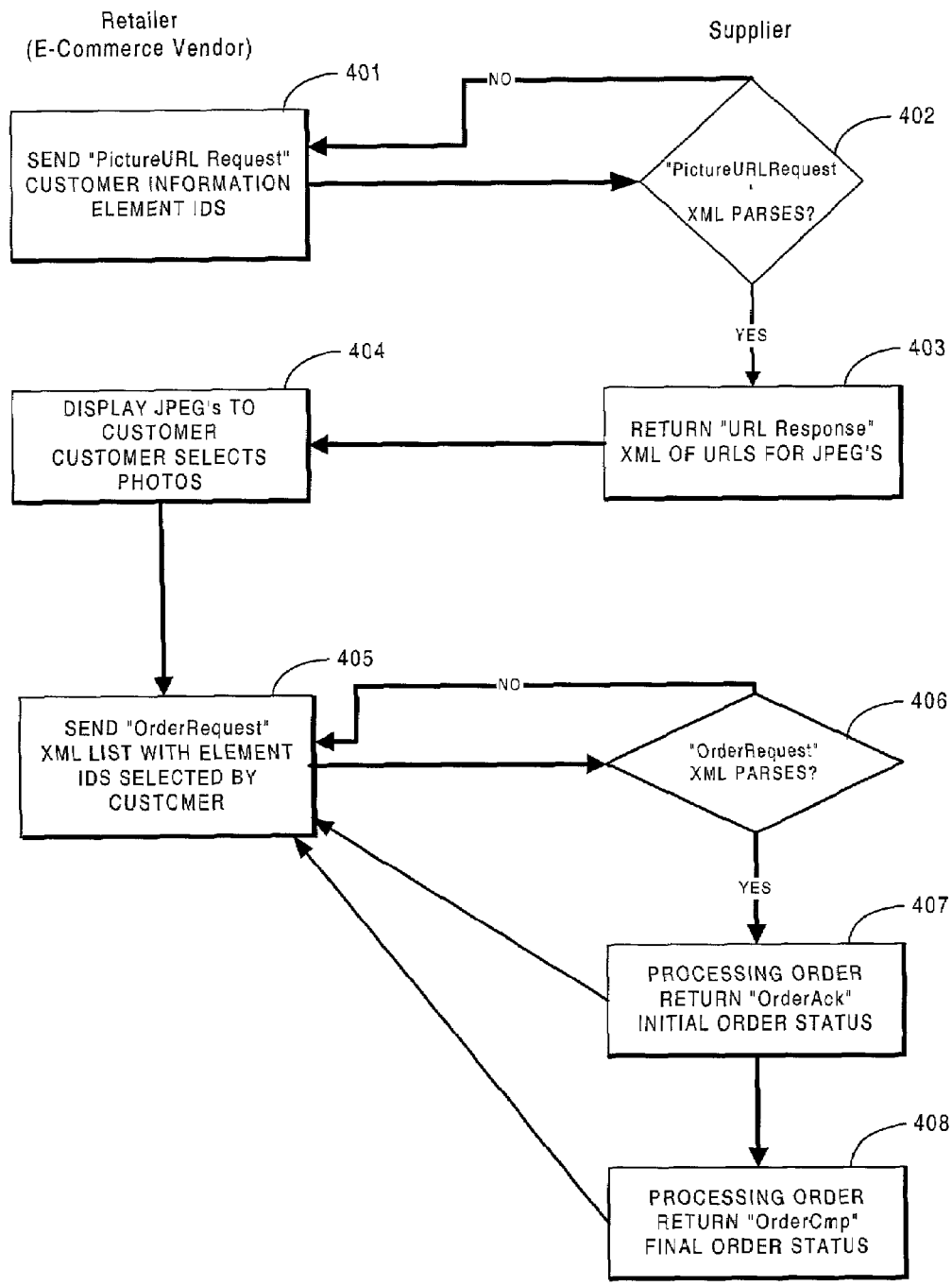
FIG. 4 is a high level flow diagram of the integrated shopping cart system illustrating the flow of information amongst the retailer and its third party suppliers and fulfillers.

FIG. 4 is a high level flow diagram of the overall method of operation of the integrated shopping cart system of the present invention, including demonstrating the flow of information between and amongst the e-commerce retailer, a third party supplier and a third party fulfiller. In general, the top half of FIG. 4 describes the flow of XML information from the retailer to the image server and back from the image server to the retailer to enable the retailer's customer to view various photograph images on the retailer site. The lower half of the figure describes at a high level the flow of XML information from the retailer to the order engine and the responses from the order engine to the retailer in connection with the ordering and fulfillment of a product order. The items indicated in quotation marks on FIG. 4 such as "PictureURL Request", "URLResponse" and "OrderRequest" correspond to specific protocol or command requests; these are explained in further detail below.

The specific steps of the method of operation are as follows. At step 401, a "PictureURLRequest" is sent from the retailer (module) to the supplier image server. The PictureURLRequest is a request by the retailer (module) to obtain from the supplier image server the URLs for certain photograph images. The PictureURLRequest includes certain element IDs for a roll of film or photographs that have been previously provided by the image server to the retailer as part of the initial "roll claim" process. The initial roll claim process is not shown in this diagram. A detailed description of the roll claiming technique (which itself is not required to implement the present invention) may be found in commonly-owned U.S. application Ser. No. 09/814,009, filed Mar. 20, 2001, the disclosure of which is hereby incorporated by reference. The PictureURLRequest may also contain information describing the format and background requested by the retailer for display of the photograph images on the retailer site.

Upon receipt of the PictureURLRequest, the image server parses the XML file received from the retailer, as shown at step 402. If the XML received from the retailer does not parse, the image server replies back to the retailer indicating that the picture request is not valid. The request may not be valid if, for example, the Element ID was incorrect or if the photograph itself had expired and was no longer available on the image server. If the XML parses and is valid, the supplier image server returns a URLResponse to the retailer, as shown at step 403, containing an XML list of the URLs where images (e.g., JPEG images) of the requested photographs can be located.

The URLResponse also provides the retailer with the information necessary to retrieve these JPEG images in various sizes and formats, and with various backgrounds. This information enables the retailer to retrieve an image in the appropriate size and format to match the specific characteristics of the retailer's own site and, thus, enables the retailer to display these images to the customer in a seamless fashion that has a consistent appearance with other elements of the retailer site. The retailer may then retrieve and render those JPEG images to the customer in the customer's browser window, as shown at step 404 on FIG. 4. The customer may then interact with the retailer to select and view photographs.

Once the customer has selected certain photographs and placed an order with the retailer, an exchange of information between the retailer and the order engine occurs to process the customer order. The particular method steps involved in this exchange are illustrated in the lower half of FIG. 4. Initially an "OrderRequest" is provided by the retailer (module) to the order engine, as shown at step 405. This OrderRequest is passed to the order engine as an XML list that consists of customer information and the element IDs, product SKUs, quantities and pricing of the items being ordered. The retailer OrderRequest may contain orders for multiple customers.

Upon receipt of the OrderRequest, the order engine parses the XML as shown at step 406. If an Element ID supplied by the retailer was incorrect or if one or more of the photographs selected is not available, the response to the retailer indicates that the order cannot be accepted. If the XML list received from the retailer parses and is valid, then as shown at step 407, the order engine accepts the order for processing and enters the order information into a database table. The order information entered into the database includes certain order items that comprise the order as well as customer information. In this case, the order engine also returns an OrderAck response to the retailer acknowledging acceptance of the order. In some cases the response provided in this OrderAck might be that certain items included in the order were available, but other order items were not available. This "OrderAck" is a temporary status that confirms receipt of the order request and advises the retailer of the initial status of the order. The order engine may in some instances send additional "OrderAck" responses during order processing in the event the status of an order changes. For example, if the supplier discovered after the initial response that one of the items ordered was not available, this updated status would be communicated to the retailer.

The final step called "OrderCmp" or order completion involves the return of the final status of the order to the retailer. As shown at step 408, the OrderCmp returned by the order engine to the retailer confirms that various order items have been shipped to the customer and notifies the retailer of any exceptions or problems with specific order items that could not be supplied. If the supplier uses a third party fulfiller instead of directly supplying the products from its own inventory, another step (not shown) may occur after the initial OrderAck (step 407) and before the final OrderCmp (step 408). This optional step is to provide the fulfiller with the necessary order details for the order item or items to be shipped by the fulfiller to the customer, to handle any exceptions or problems that may occur and to confirm shipment of the order items to the customer. After these exchanges with the third party fulfiller, the order engine communicates order completion as described above.

More specific details about each of these steps described in the flow diagram attached as FIG. 4 are described below. Further details about the additional order engine functions enabling the automatic fulfillment of order items by an external third party fulfiller are provided in FIG. 5 and in the sections below.

D. Detailed Construction of the Preferred Embodiment.

As described above, in certain situations an e-commerce retailer may market and sell products and services to be supplied by a third party. However, the retailer does not store all of the information about the third party product and services locally on its own Web site. Instead, the retailer obtains the necessary information as and when needed from the third party supplier to enable display of this information to its customer. In this situation, the third party supplier and the retailer must exchange a number of details about the products selected by the customer to enable the retailer to display the third party products to the customer and to enable the customer to purchase these products directly on the retailer site. The operations and methodology described below enable the retailer to integrate the supplier product offering into its own Web site and shopping cart, and to directly accept orders for the third party products and services through the retailer's own Web site. The following description uses as an example the supply of photographs to a customer, although this is only one example demonstrating use of this system. This system may also be used with various other types of products and services.

1. Roll Claim Process

In this example of photograph processing services, the process begins with drop off of a roll of film by the customer with a retailer for processing and the subsequent return of the processed film and prints to the customer by the retailer. The actual photograph processing is typically outsourced by the retailer to a third party photograph processor such as KODAK®. In order to make digital images available, at the time each roll of film is processed, the roll of film is scanned to produce a full-size digital image of each photograph. These images can be stored in the supplier image server previously described above.

Each processed roll of film is assigned a unique 10-digit identification (or claim) number. This 10-digit claim number is attached as part of the label to the photograph prints that are returned by the photograph processor to the retailer photograph drop-off shop for the customer. The claim number and associated customer information are stored by the supplier image server in its local database. This enables a particular customer roll of film to be identified by the customer and the photograph processor. Further description of this roll claiming technique may be found in the above-mentioned Ser. No. 09/814,009 application.

2. Request for Display of Photographs on Retailer Site

In the situation where the e-commerce retailer wishes to display the photograph images to its customers on its own site, the process begins when the customer goes to the retailer site to review digital images for a roll of film that he or she had previously had processed and returned. The customer enters registration information on the retailer site and supplies the identification number that he or she received with the processed roll of film. With this information, the retailer commences the process of interaction with the supplier to obtain copies of the digital images for display on the retailer site by sending a "PictureURL Request." The following is an example of a PictureURLRequest Data Type Definition (or DTD) showing the type of data that the image server expects to receive as part of a PictureURL Request together with an example of a PictureURLRequest XML file.

---

DTD

<!ELEMENT ElementID ( #PCDATA ) >
<!ATTLIST ElementID background CDATA #REQUIRED >
<!ATTLIST ElementID border CDATA #IMPLIED >
<!ATTLIST ElementID size NMTOKEN #REQUIRED >
<!ATTLIST ElementID squareoutput NMTOKEN #REQUIRED >
<!ELEMENT URLRequest ( ElementID+ ) >
XML <?xml version="1.0" encoding="UTF-8"?>
<!DOCTYPE URLRequest SYSTEM "URLRequest.dtd">
<URLRequest>
<ElementID size="96" background="255,255,255" border="255,255,255" squareoutput="TRUE">1239945</ElementID>
<ElementID size="96" background="255,255,255" border="255,255,255" squareoutput="FALSE">9874443</ElementID>
</URLRequest>

Note that the ElementID attribute border has the following defaults: Border=="255,255,255"

---

The "PictureURL Request" indicated as step 401 on FIG. 4 is initiated on demand by the retailer to obtain the URLs for certain pictures. The PictureURLRequest is provided as an XML list from the retailer to the supplier image server. The PictureURLRequest includes the Element ID for the photographs or roll of film requested together with all of the retailer's formatting information required for display of the photograph such as background color, border and size. This provides the retailer a method to request the images from the supplier in the appropriate size and format to match the characteristics of the retailer's site.

3. Response with URLs for Photograph Images

When the image server receives a PictureURLRequest 401 it replies with an "URLResponse" 403 as shown in FIG. 4. An example of the URLResponse is provided below.

---

DTD

<!ELEMENT ElementID ( #PCDATA ) >
<!ATTLIST ElementID error NMTOKEN #IMPLIED >
<!ATTLIST ElementID url CDATA #IMPLIED >
<!ELEMENT URLResponse ( ElementID+ ) >
XML <?xml version="1.0" encoding="UTF-8"?>
<!DOCTYPE URLResponse SYSTEM "URLResponse.dtd">
<URLResponse>
<ElementID
url="http:
//picturecenter.kodak.com/images?12399.jpg">1239945</ElementID>
    <ElementID error="404">9874443</ElementID>
</URLResponse>

---

In the event the photograph has been deleted from the image server or there is an error, appropriate error codes are returned. These codes are HTTP compatibility error codes, for example, 404 for not found and 500 for error. If the photographs are available, the URLRequest returns the specific URLs at which it has validated that certain JPEG images are available. Either a URL or an error code will be returned by the image server for each Element ID received from the retailer.

In this example, The URLResponse returned a valid URL for the Element ID 1239945 but returned a 404 error when it was unable to supply a valid JPEG for the Element ID 9874443. This error can happen if, for example, the photographs expire and are no longer retained on the image server. A "404" error code is typically returned when an HTTP request fails because of a "file not found error". Note that the Element ID (1239945) will be different than the name of the JPEG returned (12399.jpg).

In this situation, the Element ID of the photograph that is provided by the supplier is stored and returned by the retailer to the supplier when the customer places an order for a photograph print. If the Element ID is not returned, the order engine will not be able to associate the correct photograph to the order item. Also, before the URL to the photograph is used, a parameter must be appended to size the image. This allows the shopping cart user interface to determine how large the photograph should be for the shopping cart.

After return of the URLResponse to the retailer, the retailer is able to retrieve the images and render them for display through the customer's browser in response to customer requests. This enables the customer to review the photographs, to select certain photographs in certain sizes and formats and to add them to his or her shopping cart on the retailer site. These images are tagged with the Element ID and other information to enable the retailer to return the required information when placing an order for the photographs with the supplier. The specific information that is provided is described in more detail in the "Add to Cart" section below.

4. Add to Cart Operation

Alternatively, in certain situations an e-commerce retailer may want to have an integrated shopping cart that can facilitate the sale of products and services to be fulfilled by a third party, but the retailer does not want to handle the display of the product information to the customer through its own site. For example, the retailer may want to offer photograph processing services, but does not want to handle display of the photographs to the customer through the retailer's own site. In this situation, the retailer can redirect its customer to a third party supplier Web site to view copies of his or her photographs. This third party Web page is designed to look like the retailer's site, but the third party supplier handles the display of the photographs to the customer rather than enabling the retailer to display these images on its own site. In this case, when the customer selected several photographs that he or she wanted to order, the third party supplier must communicate a number of details, including the Element IDs of the photographs selected, to the retailer to enable the customer to purchase the items that he or she had selected while viewing the supplier site. The "Add to Cart" operation described below enables the retailer to integrate the supplier product offering into its own shopping cart and to directly accept orders for the supplier product.

The data that will be sent to the retailer as part of the "Add to Cart" operation and an example of the XML is as follows:

DTD

Session ID (if available)
User Login Name (if available)
Continue Shopping URL (optional)
Element ID of Picture (Must be less that 32 characters)
URL to the Picture
Product SKU (retailer)
Supplier SKU
Quantity
Unit Price
Next Product
Next Element ID of Picture
XML

```
<cart>
    <usersessionid>QLXCVOVWAF230F9VSDAM</usersessionid>
<userloginname>256330369</userloginname>
    <userid>1234569</userid>
    <continueshoppingurl>
    http://picturecenter.kodak.com/rs?handler=album&action=showalbum
    </continueshoppingurl>
    <photo elementid="001093557761">
    <product RetailerSKU="1432BLKM42">
        <SupplierSKU>QPP4X6</SupplierSKU>
        <quantity>10</quantity>
        <unitprice>$0.14</unitprice>
    </product>
    <product/> <!-- more ... -->
    <product/> <!-- and more... -->
    <product/> <!-- and more... -->
    <product/> <!-- and more... -->
    <product/> <!-- product -->
    </photo>
    <photo/> <!-- more photos -->
    <photo/> <!-- and even more photos -->
</cart>
```

The above "Add to Cart" operation transfers the necessary data from the image server to the retailer. All the data required to create an order at a later time is sent by the supplier image server to the retailer for inclusion in the retailer's shopping cart. The transfer of the data is done using XML in a sever-to-server post.

The retailer responds to confirm receipt of the appropriate information from the supplier. This response from the retailer to the supplier includes the following information:

Status Code
URL to the shopping cart
Valid Session ID

The response from the retailer destination includes the status code (success/failure). If the status code indicates failure, the customer is directed to an error page. If the order information was successfully added to the shopping cart, the response will include a link to the shopping cart where the customer will be redirected.

5. Product Order Request

After the retailer receives one or more orders including photographs or other order items to be supplied by the supplier, the retailer places an order request for the photographs with the supplier through the "OrderRequest," as shown in step 405 of FIG. 4. The following is an example of an OrderRequest XML file together with a Data Type Definition (or DTD) showing the type of data that the order engine may expect to receive as part of an OrderRequest.

DTD

```
<!ELEMENT Address1 ( #PCDATA ) >
<!ELEMENT Address2 ( #PCDATA ) >
<!ELEMENT City ( #PCDATA ) >
<!ELEMENT Country ( #PCDATA ) >
<!ELEMENT Date ( #PCDATA ) >
<!ELEMENT ElementID ( #PCDATA ) >
<!ELEMENT FirstName ( #PCDATA ) >
<!ELEMENT IDRequest ( #PCDATA ) >
<!ELEMENT Item ( OrderItemID, ElementID, RetailerSKU,
SupplierSKU, Quantity, UnitPrice, ShipTo? ) >
<!ELEMENT ItemList ( Item+ ) >
<!ELEMENT SupplierSKU ( #PCDATA ) >
<!ELEMENT LastName ( #PCDATA ) >
<!ELEMENT Order ( OrderInfo, ItemList ) >
<!ELEMENT OrderInfo ( ShipMethod, OrderNum, ShipToStoreCode,
ShipTo, SoldTo ) >
<!ELEMENT OrderItemID ( #PCDATA ) >
<!ELEMENT OrderList ( Order ) >
<!ELEMENT OrderNum ( #PCDATA ) >
<!ELEMENT OrderRequest ( VendorName, VendorNum, RetailerName,
RetailerNum, Date, IDRequest, OrderList ) >
<!ELEMENT Phone ( #PCDATA ) >
<!ELEMENT Quantity ( #PCDATA ) >
<!ELEMENT RetailerName ( #PCDATA ) >
<!ELEMENT RetailerNum ( #PCDATA ) >
<!ELEMENT RetailerSKU ( #PCDATA ) >
<!ELEMENT ShipMethod ( #PCDATA ) >
<!ELEMENT ShipTo ( Address1 | Address2 | City | Country | FirstName |
LastName | Phone | State | Zip )* >
<!ELEMENT ShipToStoreCode ( #PCDATA ) >
<!ELEMENT SoldTo ( FirstName, LastName, Phone, Address1,
Address2, City, State, Zip, Country ) >
<!ELEMENT State ( #PCDATA ) >
<!ELEMENT UnitPrice ( #PCDATA ) >
<!ELEMENT VendorName ( #PCDATA ) >
<!ELEMENT VendorNum ( #PCDATA ) >
<!ELEMENT Zip ( #PCDATA ) >
```
XML
```
<?xml version="1.0" encoding="UTF-8"?>
<!DOCTYPE OrderRequest SYSTEM "OrderRequest.dtd">
<OrderRequest>
<VendorName>BLUELIGHT</VendorName>
    <VendorNum>123</VendorNum>
    <Date>20001224</Date>
```

-continued

```
<RetailerName>BLUELIGHT</RetailerName>
<RetailerNum>67</RetailerNum>
<OrderList>
    <Order>
        <OrderInfo>
            <ShipMethod>1</ShipMethod>
            <OrderNum>99362100301</OrderNum>
            <ShipTo>
                <FirstName>Joe/FirstName>
                <LastName>Smith</Name>
                <Phone>831-555-1212</Phone>
                <Address1>123 Main St</Address1>
                <Address2>Apartment 444</Address2>
                <City>Santa Cruz</City>
                <State>CA</State>
                <Zip>95060</Zip>
                <Country>USA</Country>
            </ShipTo>
            <SoldTo>
                <FirstName>Joe</FirstName>
                <LastName>Smith</LastName>
                <Phone>831-555-1414</Phone>
                <Address1>123 Main St</Address1>
                <Address2>Apartment 444</Address2>
                <City>Santa Cruz</City>
                <State>CA</State>
                <Zip>95060</Zip>
                <Country>USA</Country>
            </SoldTo>
        </OrderInfo>
        <ItemList>
            <Item>
                <OrderItemID>1</OrderItemID>
                <ElementID>34343434</ElementID>
                <RetailerSKU>111144434BL</RetailerSKU>
                <SupplierSKU>QPP4X6</SupplierSKU>
                <Quantity>13</Quantity>
                <UnitPrice>0.49</UnitPrice>
            </Item>
            <Item>
                <OrderItemID>2</OrderItemID>
                <ElementID >12121212</ElementID >
                <RetailerSKU>55553563BL</RetailerSKU>
                <SupplierSKU>QPP5X7</SupplierSKU>
                <Quantity>2</Quantity>
                <UnitPrice>1.49 </UnitPrice>
                <ShipTo>
                    <FirstName>John</FirstName>
                    <LastName>Doe</LastName>
                    <Phone>617-555-1212</Phone>
                    <Address1>123 Market St</Address1>
                    <Address2></Address2>
                    <City>Boston</City>
                    <State>MA</State>
                    <Zip>01234</Zip>
                    <Country>USA</Country>
                </ShipTo>
            </Item>
            <Item>
                <OrderItemID>3</OrderItemID>
                <ElementID >28282828</ElementID>
                <RetailerSKU>55553563BL</RetailerSKU>
                <SupplierSKU>QPP5X7</SupplierSKU>
                <Quantity>1</Quantity>
                <UnitPrice>1.49</UnitPrice>
            </Item>
        </ItemList>
    </Order>
</OrderList>
</OrderRequest>
```

This OrderRequest consists of an XML file that is sent from the retailer to the order engine containing the order information. Each OrderRequest may contain multiple customer orders from the retailer. For example, one XML file may include orders for 35 line items to be supplied to 10 different customers. Each order contains certain required items of information, including the set of items ordered (each an "order item"), the customer that ordered each order item and the address for shipment of each order item. Under each order item there are several pieces of information such as product SKUs that are tracked and maintained in the order engine database. For example, the database includes both the retailer and the supplier SKU for each item. This enables both the retailer and the supplier to track the order item by their own internal SKU. This OrderRequest provides all the information necessary for the supplier (or its third party fulfiller) to identify the correct product and ship it to the customer to fulfill the order.

6. Order Acknowledgement

The order engine responds to the OrderRequest received from the retailer with an OrderAck, as shown in step 407 of FIG. 4. This OrderAck is an XML file that is sent from the order engine to the retailer confirming the receipt of the order and indicating an initial status. The OrderAck may also cancel one or more of the order items included in the order. For example, a specific line item (or order item) for a specific photograph that is included in the OrderRequest may be cancelled if the order engine cannot obtain a copy of the photograph from the image server because that photograph has expired or been deleted from the image server. Another reason for cancellation of an order item is that an error or problem is detected by the supplier (or a third party fulfiller if applicable) with a particular order item. In some cases the cancellation of an order item will be identified immediately by the order engine in the initial OrderAck response to the retailer. In other cases, the cancellation of an order item will happen after the initial OrderAck has been sent to the retailer. In this case the cancellation will be included in a later OrderAck or in the final OrderCmp acknowledgement described below.

The following are three different examples of an OrderAck response to the OrderRequest described above together with the associated data type definition (DTD).

DTD

```
<!ELEMENT Date ( #PCDATA ) >
<!ELEMENT Error EMPTY >
<!ATTLIST Error code NMTOKEN #REQUIRED >
<!ATTLIST Error message CDATA #REQUIRED >
<!ELEMENT Item ( OrderItemID, Error ) >
<!ELEMENT Item List ( Item ) >
<!ELEMENT Order ( OrderInfo, Item List ) >
<!ELEMENT OrderAck ( VendorName, VendorNum, Date,
RetailerName, RetailerNum, OrderList ) >
<!ELEMENT OrderInfo ( OrderNum ) >
<!ELEMENT OrderItemID ( #PCDATA ) >
<!ATTLIST OrderItemID quantity NMTOKEN #REQUIRED >
<!ELEMENT OrderList ( Order ) >
<!ELEMENT OrderNum ( #PCDATA ) >
<!ELEMENT RetailerName ( #PCDATA ) >
<!ELEMENT RetailerNum ( #PCDATA ) >
<!ELEMENT VendorName ( #PCDATA ) >
<!ELEMENT VendorNum ( #PCDATA ) >
```

XML for Example 1

```
<?xml version="1.0" encoding="UTF-8"?>
<!DOCTYPE OrderAck SYSTEM "OrderAck.dtd">
<OrderAck>
<VendorName>BLUELIGHT</VendorName>
    <VendorNum>123<VendorNum>
    <Date>20001224</Date>
```

-continued

```
      <RetailerName>BLUELIGHT</RetailerName>
      <RetailerNum>67</RetailerNum>
      <OrderList>
         <Order>
            <OrderInfo>
               <OrderNum>99362100301</OrderNum>
            </OrderInfo>
            <ItemList>
               <Item>
                  <OrderItemID quantity="5">5656565</OrderItemID>
                  <Error code="1" message="Canceled,expired"></Error>
               </Item>
            </Item List>
         </Order>
      </OrderList>
</OrderAck>
```

XML for Example 2

```
<?xml version="1.0" encoding="UTF-8"?>
<!DOCTYPE OrderAck SYSTEM "OrderAck.dtd">
<OrderAck>
<VendorName>BLUELIGHT</VendorName>
   <VendorNum>123</VendorNum>
   <Date>20001224</Date>
   <RetailerName>BLUELIGHT</RetailerName>
   <RetailerNum>67</RetailerNum>
   <OrderList>
      <Order>
         <OrderInfo>
            <OrderNum>99362100301</OrderNum>
         </OrderInfo>
         <ItemList>
            <Item>
               <OrderItemID quantity="5">34343434</OrderItemID>
               <Error code="1" message="Canceled, copyright"/>
            </Item>
         </ItemList>
      </Order>
   </OrderList>
</OrderAck>
```

XML for Example 3.

```
<?xml version="1.0" encoding="UTF-8"?>
<!DOCTYPE OrderAck SYSTEM "OrderAck.dtd">
<OrderAck>
   <VendorName>BLUELIGHT</VendorName>
   <VendorNum>2468</VendorNum>
   <Date>20001224</Date>
   <RetailerName>BLUELIGHT</RetailerName>
   <RetailerNum>67</RetailerNum>
   <OrderList>
      <Order>
         <OrderInfo>
            <OrderNum>99362100301</OrderNum>
         </OrderInfo>
         <ItemList>
            <Item>
               <OrderItemID quantity="5">1</OrderItemID>
               <Error code="1" message="Canceled,expired"></Error>
            </Item>
            <Item>
               <OrderItemID quantity="4">2</OrderItemID>
               <Error code="1" message="Canceled,expired"></Error>
            </Item>
            <Item>
               <OrderItemID quantity="3">3</OrderItemID>
            </Item>
         </ItemList>
      </Order>
   </OrderList>
</OrderAck>
```

As shown above, the first response cancels one order item because the photograph was found to have expired and thus was not available for fulfillment of this order item. This response includes an error code explaining why the order item was cancelled. The second response cancels a second order item because of an error subsequently found by a third party fulfiller. These responses are sent to the retailer at two different times and result in the cancellation of two order items included in the OrderRequest. The third example is an OrderAck response indicating that the third order item is available and indicates that the supplier intends to accept and fulfill the order for this item.

7. Order Completion

When the order has been completed and all of the order items that have not been cancelled have been shipped by the supplier (or, alternatively, by a third party fulfiller as described below), the order engine sends an "OrderCmp" or order completion acknowledgement to the retailer, as shown in step 408 of FIG. 4. This OrderCmp lists all the remaining order items and confirms that all of the listed order items have been supplied to the customer and that the order is complete. There are two possible error codes that may be included in this OrderCmp response: zero which means that the order item has been successfully shipped; and non-zero which means that the order item has been cancelled and repeats the applicable error code in a format similar to that described with the OrderAck above.

DTD

```
<!ELEMENT Date ( #PCDATA ) >
<!ELEMENT Error EMPTY >
<!ATTLIST Error code NMTOKEN #REQUIRED >
<!ATTLIST Error message CDATA #REQUIRED >
<!ELEMENT Item ( OrderItemID, Error ) >
<!ELEMENT ItemList ( Item+ ) >
<!ELEMENT Order ( OrderInfo, ItemList ) >
<!ELEMENT OrderComplete ( VendorName, VendorNum, Date, OrderList ) >
<!ELEMENT OrderInfo ( OrderNum ) >
<!ELEMENT OrderItemID ( #PCDATA ) >
<!ATTLIST OrderItemID quantity NMTOKEN #REQUIRED >
<!ELEMENT OrderList ( Order ) >
<!ELEMENT OrderNum ( #PCDATA ) >
<!ELEMENT VendorName ( #PCDATA ) >
<!ELEMENT VendorNum ( #PCDATA ) >
```

XML

```
<?xml version="1.0" encoding="UTF-8"?>
<!DOCTYPE OrderComplete SYSTEM "OrderComplete.dtd">
<OrderComplete>
<VendorName>BLUELIGHT</VendorName>
   <VendorNum>123</VendorNum>
   <Date>20001224</Date>
   <OrderList>
      <Order>
         <OrderInfo>
            <OrderNum>99362100301</OrderNum>
         </OrderInfo>
         <ItemList>
            <Item>
               <OrderItemID quantity="5">8989899</OrderItemID>
                  <Error code="0" message="success"/>
            </Item>
            <Item>
               <OrderItemID quantity="4">34343434</OrderItemID>
               <Error code="1" message="Canceled, copyright"/>
            </Item>
            <Item>
               <OrderItemID quantity="3">5656565</OrderItemID>
               <Error code="1" message="Canceled,expired"/>
            </Item>
         </ItemList>
      </Order>
   </OrderList>
</OrderComplete>
```

E. Construction of Optional System for Third Party Fulfillment of Orders

As an alternative to directly fulfilling the orders received from the retailer, the supplier may have an arrangement with an external third party fulfiller for the fulfiller to supply certain products or services to the supplier's customers. In this situation, the order engine is adapted to perform the additional Tasks necessary to arrange and confirm fulfillment of a product order by a third party fulfiller. This order fulfillment service may also be used in other situations, including use by an e-commerce site in connection with the fulfillment of its own orders. However, the following description is based on the prior example involving the receipt by a supplier of an order for photographs from a retailer client.

Figure 5:
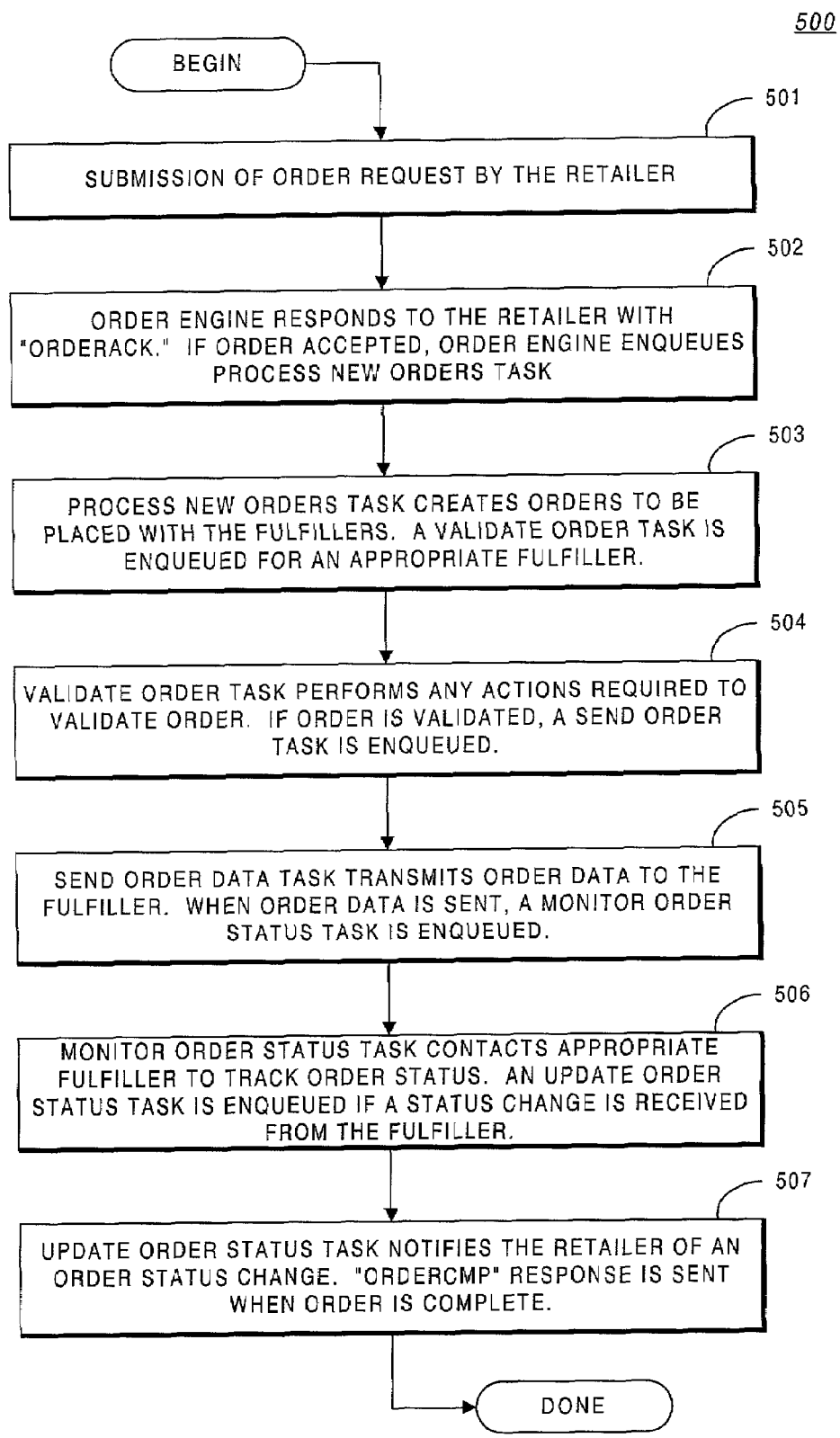
FIG. 5 is a high level flow diagram of the optional fulfillment service illustrating the flow of information between the supplier, a third party fulfiller and the e-commerce retailer in connection with the fulfillment of a product order.

Receipt of an OrderRequest by the order engine as described above initiates the fulfillment process as described in the flow diagram attached as FIG. 5. Alternatively, the order engine can monitor certain retailers or other clients for new orders. When a new order request is received by the order engine, the OrderRequest XML is validated. If the XML is valid, the order engine will respond with an OrderAck as described above that initially accepts or rejects each of the order items in the order. For each accepted order item, a new Task is enqueued by the order engine's fulfillment service to handle processing and fulfillment of each accepted order item.

Through a cascading series of Tasks, the order engine will then process the order, send the order to the appropriate third party fulfiller or fulfillers, and notify its client (the retailer in this example) as the order status changes. The order engine will send an XML OrderAck or OrderCmp response to the retailer as described above when there is a status update. The status of each order can be updated multiple times as the status of individual order items changes.

The fulfillment service provided by the order engine includes a Queue Manager that processes Tasks that will perform all the actions necessary to fulfill an order. This Queue Manager continuously looks in the queue for any pending Tasks. If there is a Task pending, it will de-queue the Task and spawn a thread that runs a Task consumer. Each Task consumer will look up a fulfiller class in the database, create an object of that class type and then call methods of an interface that the fulfiller class implements. Tasks will be de-queued until a maximum number of concurrently running consumers per machine is reached. Multiple machines that run the fulfillment service Queue Manager may be employed to scale the system and for fail-safe redundancy. Further description of the operations of the Queue Manager may be found in the previously-mentioned application Ser. No. 09/814,009.

The fulfillment service uses its own database to maintain the information necessary to its operations. Because all orders are fulfilled from the same database it is easy to control the load that is placed on fulfiller ftp and http sites. Load limiting is accomplished by keeping the current and maximum number of connections to a given site in the database. If the maximum number of connections is reached Tasks that connect to these sites will not be processed.

There are five types of Tasks that are used in the fulfillment service portion of the order engine: Process New Order, Validate Order, Send Order Data, Monitor Order Status, and Update Order Status. Each Task will perform actions that depend on the particular fulfiller that is associated with the Task. The Tasks cascade in that each Task initiates the next Task in the process until all Tasks have been completed. All Tasks are completed when the order for each order item has been fulfilled or cancelled and the appropriate status notification has been provided to the retailer that placed the order.

A flow diagram of these Tasks is attached as FIG. 5. FIG. 5 also shows the interaction of the order engine with the retailer client and the fulfiller in connection with the operation of these Tasks. The operation of each of these Tasks is described in more detail below.

Submission of an OrderRequest by the retailer or client, as shown at step 501 of FIG. 5, initiates the order fulfillment process. As described above the order engine responds to the retailer as shown at step 502, with an initial OrderAck indicating the status of the order. If the order engine accepts the order for one or more order items, it also initiates the fulfillment process by enqueuing the "Process New Orders" Task.

The Process New Order Task, as shown at step 503 of FIG. 5, is responsible for creating orders to be placed with the fulfiller or fulfillers. Each fulfiller order is identified by a unique order identification number ("order ID"). The actions taken by this Task are product specific and may include splitting the order across multiple fulfillers. For each fulfiller order a Validate Order Task is enqueued.

The Validate Order Task, as shown at step 504, performs any actions that are required to verify that the order should be sent to the fulfiller. This includes making sure that the image data is available for photograph order items that are received from the retailer. If the order is validated, then a Send Order Task is enqueued.

The Send Order Data Task, as shown at step 505, is responsible for transmitting the order data to the fulfiller via FTP or HTTP. This Task assigns an associated fulfiller ID and fulfiller order ID. The Send Order Data Task performs actions based on the fulfiller requirements for placement of an order and may be load limited if this type of limitation is required by the fulfiller. When the order data is sent to the fulfiller, a Monitor Order Status Task is enqueued.

The Monitor Order Status Task, as shown at step 506, is responsible for contacting each fulfiller to track the status of each fulfiller order and for updating the fulfiller order status when a status change occurs. This Task may also execute fulfiller specific actions. An Update Order Status Task is enqueued if a status change is received from the fulfiller.

The Update Order Status Task, as shown at step 507, is responsible for contacting the fulfillment client (the retailer) to notify the retailer of an order status change. This status notification is sent by the order engine to the retailer as an OrderAck or an OrderCmp response as described above. The sending of a final OrderCmp acknowledgement to the retailer indicating the final status of an order completes the order process for a particular OrderRequest placed by the retailer.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. An improved method for an e-commerce retailer to display and sell items of a third party comprising:
    identifying, by a processor, each item of a third party supplier with a unique identifier, wherein a particular third party supplier provides photo-finishing services;
    associating, by a processor, the unique identifier of the item with an image for the item, said image residing on a computer maintained by the third party supplier, wherein the unique identifier is further associated with a user, at least one of the images corresponding to user photographic images;

in response to a product request from the user to the e-commerce retailer, the e-commerce retailer presenting at least some of the images of third party supplier items to the user for on-line commerce, said images being retrieved from said computer maintained by the third party supplier in response to the product request, the product request being a user-initiated request for at least one specific item of the third party; and in response to an order request from the user to the e-commerce retailer, for one or more items, identifying, by a processor, based at least in part on said unique identifier, each item requested, the user, and an appropriate third party supplier for each requested item, automatically generating, by a processor, an order for each requested item to be transparently sent to the third party supplier, and when the order includes items from the e-commerce retailer and user photographic images, splitting amongst the retailer and appropriate third party suppliers.

2. The method of claim 1, wherein the items include products.

3. The method of claim 1, wherein the items include services.

4. The method of claim 1, wherein the images of items include graphic images.

5. The method of claim 1, wherein the images of items include descriptive text.

6. The method of claim 1, wherein a given unique identifier references a corresponding product Stock Keeping Unit (SKU) numbers.

7. The method of claim 1, wherein a given unique identifier references pricing information from a third party.

8. The method of claim 1, wherein a given unique identifier references order fulfillment information.

9. The method of claim 1, wherein said step of presenting includes:

requesting images from a third party supplier;

receiving a list of Uniform Resource Locators (URLs) for said requested images; and displaying an on-line page that displays images retrieved from said URLs.

10. The method of claim 9, wherein the request for images includes background and formatting information of a particular third party supplier.

11. The method of claim 1, wherein a given third party supplier provides Uniform Resource Locators (URLs) for images in various sizes and formats, thereby enabling retrieval and display of images to the user in various sizes and formats.

12. The method of claim 1, wherein a given third party supplier initially provides smaller thumbnail images of the items and provides larger images in response to user requests.

13. The method of claim 1, wherein a given third party supplier evaluates the request for images or descriptions and automatically indicates whether corresponding items are available.

14. The method of claim 1, wherein the unique identifier associated with a given item is stored in a user's shopping cart when the user selects the item.

15. The method of claim 1, wherein the images are rendered on a Web page for display to the user.

16. The method of claim 1, wherein the unique identifier of an item requested by the user is employed for placing a fulfillment request with a corresponding third party supplier.

17. The method of claim 1, further comprising:

automatically splitting an order including individual order items from more than one third party suppliers; and assigning fulfillment of individual order items to the appropriate third party suppliers.

18. A system providing an improved method for an e-commerce retailer to display and sell items of a third party, said system comprising:

an e-commerce retailer to identify each item of a third party supplier with a unique identifier, wherein an item of a third party supplier includes at least one graphic image and corresponds to a photo finishing service offered to a user, the unique identifier associated, at least in part, with the user;

an image server configured to receive user information requests from the e-commerce retailer regarding certain third party supplier items including a user-initiated information request from the user for at least one specific item of the third party, and transparently provide images and descriptions of said items retrieved from a computer maintained by the third party supplier in response to user information requests at least some graphic images being based on photographs previously taken by the user; and an order engine module, in communication with said image server module, for processing orders for third party supplier items, the order engine module further for splitting orders that include items from the e-commerce retailer and items corresponding to user photographs from one or more third party suppliers amongst the e-commerce retailer and appropriate third party suppliers.

19. The system of claim 18, wherein the items include products.

20. The system of claim 18, wherein the items include services.

21. The system of claim 18, wherein the order engine module automatically determines an appropriate third party fulfiller for each item.

22. The system of claim 18, wherein the order engine module:

automatically splits an order among more than one third party suppliers; and automatically assigns fulfillment of individual order items to one or more appropriate third party suppliers.

23. A computer readable medium that provides instructions, which when executed on a processing system, cause said processing system to perform a method comprising:

identifying each item of a third party supplier with a unique identifier;

associating the unique identifier of the item with an image for the item, said image residing on a computer maintained by the third party supplier, wherein the unique identifier is further associated with a user;

transparently presenting, by an e-commerce system, third party supplier items to a user for on-line commerce;

receiving user information requests at the e-commerce system regarding certain graphic images from an item presentation program logic, and providing digital images for display wherein said digital images are retrieved from a computer system maintained by the third party supplier in response to the product request, the product request being a user-initiated request for at least one specific item of the third party;

splitting orders that include items from the e-commerce system and items from one or more third party suppliers amongst the e-commerce system and the appropriate third party suppliers, wherein a particular third party supplier provides photo-finishing services for the graphic images and at least some of the items include user photographic images; and processing orders for graphic images to be transparently sent to the appropriate third party supplier.

24. The computer readable medium of claim 23, wherein the processing orders further comprises:

automatically splitting an order including individual graphic images from more than one third party fulfiller, and assigning fulfillment of individual order items to one or more appropriate third party fulfillers.

25. The computer readable medium of claim 23, wherein the processing orders further comprises:

automatically determining a source of fulfillment of each graphic image.

26. A computer readable medium that provides instructions, which when executed on a processing system, cause said processing system to perform a method comprising:

identifying, with a tagging logic, each item of a third party supplier with a unique identifier, each unique identifier associated with data about that item and a user wherein a particular third party supplier provides photo-finishing services;

transparently presenting, with an e-commerce logic, at least some of the items to the user for on-line commerce in response to a user-initiated information request for a third party supplier item;

retrieving the data, with an XML request logic, about the one or more items from a third party supplier website, and enabling the e-commerce logic to present the data to the user for the on-line commerce; and splitting an order amongst the e-commerce retailer and appropriate third party suppliers when the order includes items from a retailer and user photographic images:

processing orders for items with an order engine.

27. The computer readable medium of claim 26, wherein the data is image data.

28. The computer readable medium of claim 26, wherein the items include products.

29. The computer readable medium of claim 26, wherein the items include services.

* * * * *